K. MATHEUS.
SLED.
APPLICATION FILED DEC. 3, 1917. RENEWED MAY 19, 1919.
1,318,166.
Patented Oct. 7, 1919.
3 SHEETS—SHEET 2.
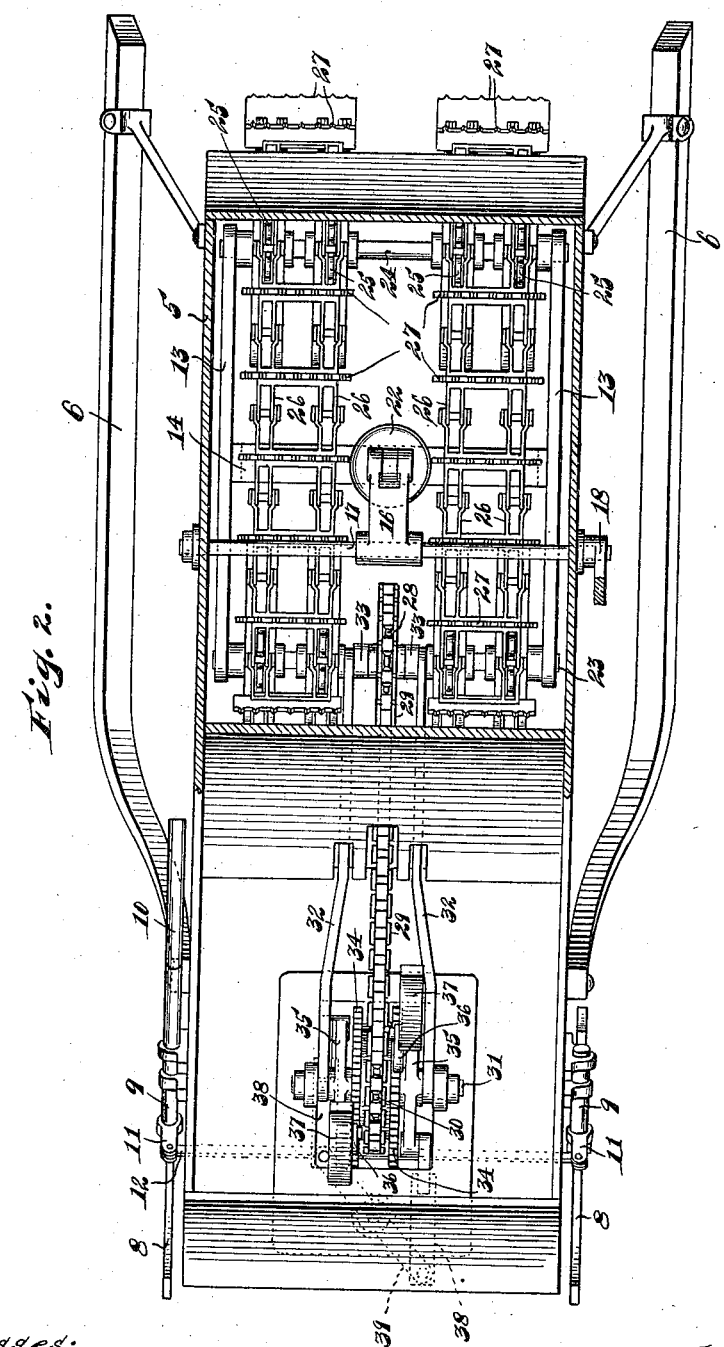

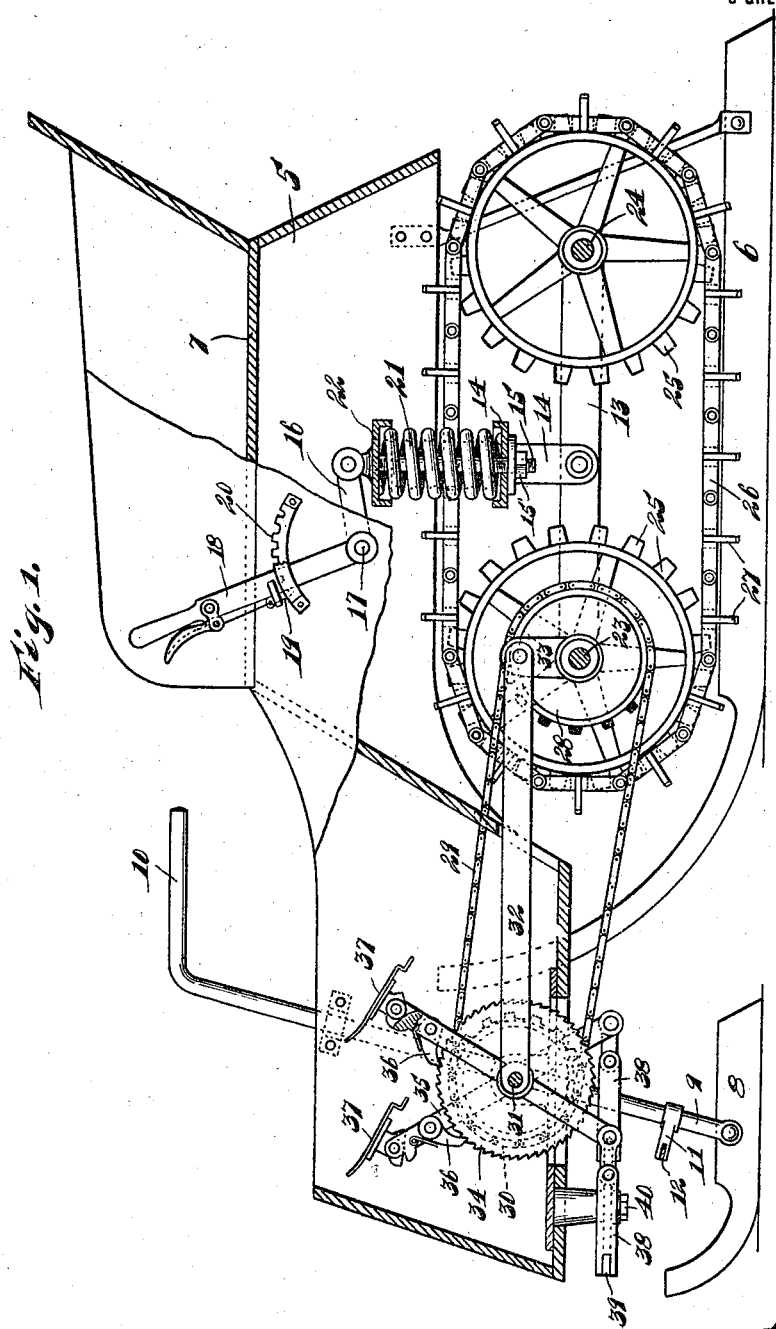

K. MATHEUS.
SLED.
APPLICATION FILED DEC. 3, 1917. RENEWED MAY 19, 1919.
1,318,166.
Patented Oct. 7, 1919.
3 SHEETS—SHEET 3.
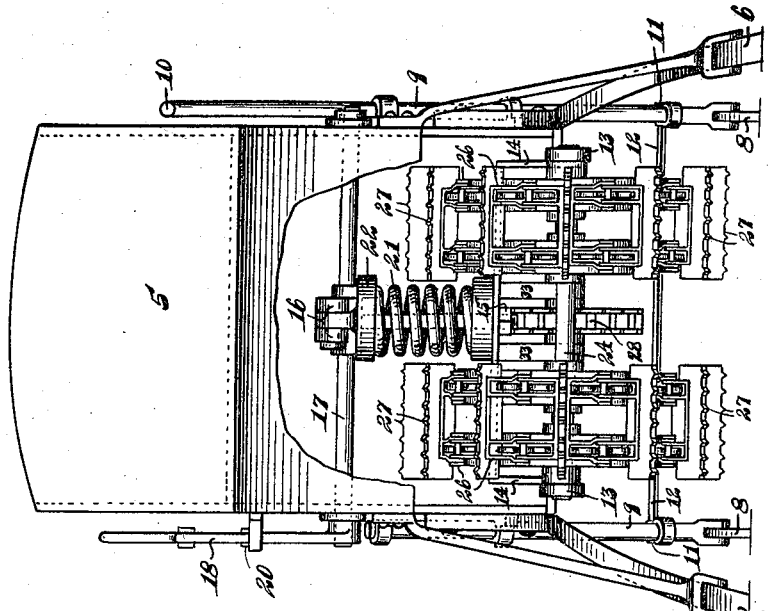

UNITED STATES PATENT OFFICE.

KARL MATHEUS, OF CHICAGO, ILLINOIS, ASSIGNOR TO RICHARD HOCHMUTH, OF CHICAGO, ILLINOIS.

SLED.

1,318,166.   Specification of Letters Patent.   Patented Oct. 7, 1919.

Application filed December 3, 1917, Serial No. 205,074. Renewed May 19, 1919. Serial No. 298,343.

*To all whom it may concern:*

Be it known that I, KARL MATHEUS, a citizen of the United States, and a resident of the city of Chicago, county of Cook, and State of Illinois, have invented certain new and useful Improvements in Sleds, of which the following is a specification.

My invention relates to improvements in sleds and has for its object the provision of a sled equipped with improved means for propelling the same.

The invention consists in the combinations and arrangements of parts hereinafter described and claimed.

The invention will be best understood by reference to the accompanying drawings forming a part of this specification, and in which, Figure 1 is a side view shown partially in section of a sled embodying the invention, Fig. 2, a top plan view, shown partially in section, of the same, Fig. 3, a transverse vertical section taken through the forward portion of the sled, and Fig. 4, a rear view of the sled with portions broken away for the sake of clearness.

The preferred form of construction as illustrated in the drawings comprises a sled body 5 mounted upon supporting runners 6 and equipped with a suitable seat 7 as shown. The sled body 5 is also equipped with steering runners 8 mounted on the lower ends of oscillatory steering rods 9, one of said steering rods being extended upwardly as shown and provided with a steering handle 10. Both of the rods 9 carry forwardly extending rocker arms 11 connected by a link 12 so as to compel movement of the steering runners 8 in unison with each other.

A propulsion frame 13 is arranged under the seat 7, said frame being equipped with a central transverse supporting bail 14 slidably mounted on the lower end of a link 15 depending from a rocker arm 16 fixed centrally to a rocker shaft 17 arranged transversely under the seat 7. Shaft 17 is provided at one side with an operating handle 18 equipped with a detent 19 coöperating with a toothed segment 20 and by means of which the propulsion frame 13 may be readily adjusted vertically. A compression spring 21 is imprisoned on link 15 between a cup-shaped socket 22 secured to the upper portion of said link and the upper side of the top of bail 14, an adjusting nut 15' being provided on the lower end of said link for adjusting the tension in said spring and said spring being adapted to permit of a certain amount of upward yielding of the frame 13. Sprocket shafts 23 and 24 are mounted respectively at the forward and rear ends of frame 13 and each is equipped with two pairs of sprocket wheels 25 as shown. Sprocket chains 26 are arranged on sprockets 25 and toothed traction contact members 27 are secured between adjacent pairs of sprocket chains 26 in position to contact with the ground and serve as a means of propulsion, the handle 18 serving to adjust the contacts 27 into and out of contact with the ground and the spring 21 yielding sufficiently to adjust said contacts to inequalities in the ground.

The forward shaft 23 carries a central sprocket wheel 28 connected by a sprocket chain 29 with another sprocket wheel 30 on a driving shaft 31 mounted transversely in the forward portion of the sled body. A link 32 is pivotally connected with shaft 31 and also with a rocker arm 33 on shaft 23 to maintain the shafts 23 and 31 in proper relation during adjustments of shaft 23. Ratchet wheels 34 are fixed to shaft 31 and coöperate with operating levers 35 loosely mounted on shaft 31 and carrying pawls 36 arranged to engage said ratchet wheels. Each of the levers 35 is equipped with an operating pedal 37 and is connected at its lower end by means of a link 38 with the corresponding end of a rocker arm 39 pivoted at 40 to the underside of the sled body. By this arrangement, by operating the pedal 37 with the feet the shaft 31 is continuously driven in the direction to operate the propulsion chains 26 to drive the sled forwardly when the contacts 27 are lowered into contact with the ground, the rocker arm and link connection between the lower ends of the levers 35 accomplishing the return inoperative movements in said levers. By this arrangement an extended and adequate traction engagement is offered with the ground for the propulsion of the sled and the traction contacts automatically adjust themselves to such contact notwithstanding inequalities in the ground. The specific arrangement set forth is a simple and efficient one for the purpose While I have illustrated and described the preferred form of construction for carrying my invention into effect, this is capable of variation and modification without departing from the spirit of the invention. I, therefore, do not wish to be limited to the precise details of construction set forth but desire to avail myself of such variations and modifications as come within the scope of the appended claims.

Having described my invention what I claim as new and desire to secure by Letters Patent is:

1. The combination with a sled, of a rocker shaft traversing the same; an operating handle for operating said shaft; a rocker arm arranged on said shaft centrally with relation to the body of said sled; a depending link on said rocker arm; a frame pivoted on the lower end of said link; an endless conveyer element mounted on said frame; and contacts on said element arranged to engage the ground, substantially as described.

2. The combination with a sled, of a rocker shaft traversing the same; an operating handle for operating said shaft; a rocker arm arranged on said shaft centrally with relation to the body of said sled; a depending link on said rocker arm; a compression spring on said link yieldingly pressing said frame downwardly; a frame pivoted on the lower end of said link; an endless conveyer element mounted on said frame; and contacts on said element arranged to engage the ground, substantially as described.

3. The combination with a sled, of a rocker shaft traversing the same; an operating handle on said shaft; a rocker arm positioned on said shaft centrally with respect to said sled; a depending link on said rocker arm; a frame slidable on said link; a compression spring on said link yieldingly holding said frame in depressed position; transverse sprocket shafts at the forward and rear ends of said frame; two pairs of sprocket wheels on each of said shafts; sprocket chains passing over said sprocket wheels; toothed contact members mounted on adjacent pairs of sprocket chains and arranged to engage the ground; and means for driving said sprocket chains, substantially as described.

4. The combination with a sled, of a rocker shaft traversing the same; an operating handle on said shaft; a rocker arm positioned on said shaft centrally with respect to said sled; a depending link on said rocker arm; a frame slidable on said link; a compression spring on said link yieldingly holding said frame in depressed position; transverse sprocket shafts at the forward and rear ends of said frame; two pairs of sprocket wheels on each of said shafts; sprocket chains passing over said sprocket wheels; toothed contact members mounted on adjacent pairs of sprocket chains and arranged to engage the ground; a transverse driving shaft on the forward portion of said sled; rocker levers pivoted on said shaft; ratchet wheels secured to said shaft in operative relation with said levers; pawls on said levers coöperating with said ratchet wheels; pedals on said levers; a sprocket wheel and chain connection between said driving shaft and the forward of said sprocket shafts; a link connection between said driving shaft and the forward of said sprocket shafts; and a rocker arm and link connection between said levers, substantially as described.

5. The combination with a sled, of a driving shaft arranged transversely thereof; rocker levers on said shaft; ratchet wheels fixed to said shaft and coöperating with said levers; pawls on said levers; pedals on said levers; a rocker arm and link connection between said levers; propelling means on said sled arranged to contact with the ground; and an operative connection between said driving shaft and said propelling means, substantially as described.

In testimony whereof I have signed my name to this specification in the presence of two subscribing witnesses.

KARL MATHEUS.

Witnesses:
JOSHUA R. H. POTTS,
MILDRED E. ANDERSON.

Copies of this patent may be obtained for five cents each, by addressing the "Commissioner of Patents, Washington, D. C."